United States Patent [19]

Koyama

[11] Patent Number: 4,554,604

[45] Date of Patent: Nov. 19, 1985

[54] VIDEO SIGNAL RECORDING AND/OR REPRODUCING APPARATUS HAVING A FUNCTION TO TEMPORARILY STOP RECORDING

[75] Inventor: Tsuneyuki Koyama, Yokohama, Japan

[73] Assignee: Victor Company of Japan, Ltd., Yokohama, Japan

[21] Appl. No.: 496,129

[22] Filed: May 19, 1983

[30] Foreign Application Priority Data

| May 21, 1982 | [JP] | Japan | 57-85709 |
| May 28, 1982 | [JP] | Japan | 57-90842 |
| May 28, 1982 | [JP] | Japan | 57-90843 |
| Jun. 15, 1982 | [JP] | Japan | 57-102900 |

[51] Int. Cl.[4] .................. G11B 5/00; G11B 15/00; H04N 5/76
[52] U.S. Cl. ........................... 360/95; 360/83; 360/85
[58] Field of Search .............. 360/10.1, 83, 85, 90, 360/93, 95, 88

[56] References Cited

U.S. PATENT DOCUMENTS

| 4,370,682 | 1/1983 | Katoh | 360/71 |
| 4,425,590 | 1/1984 | Johnstone | 360/95 X |
| 4,470,086 | 9/1984 | Maeda | 360/85 |

FOREIGN PATENT DOCUMENTS 2337619 7/1973 Fed. Rep. of Germany .
3121982 6/1981 Fed. Rep. of Germany .

Primary Examiner—Robert L. Richardson
Attorney, Agent, or Firm—Michael N. Meller

[57] ABSTRACT

A video signal recording and/or reproducing apparatus comprises a tape loading mechanism for loading a tape along a predetermined tape path when a recording or reproducing mode is adopted by drawing the tape outside a tape cassette and unloading the tape when a stop mode is adopted by unloading the tape into the tape cassette in a state accommodated within the tape cassette, a power source switch, a power source turned ON or OFF in response to the ON and OFF states of the power source switch, a tape travel control circuit for causing tape travel in a forward direction during the recording mode and stopping the tape travel after causing the tape to travel in a reverse direction for a predetermined time interval when the power source switch is turned OFF during the recording mode, and a circuit for turning OFF the power source in a state where the tape is substantially loaded by the tape loading mechanism when the tape stops after traveling in the reverse direction for the predetermined time interval.

10 Claims, 8 Drawing Figures

FIG. 1

FIG. 2

VIDEO SIGNAL RECORDING AND/OR REPRODUCING APPARATUS HAVING A FUNCTION TO TEMPORARILY STOP RECORDING

BACKGROUND OF THE INVENTION

The present invention generally relates to video signal recording and/or reproducing apparatuses having a function for temporarily stopping recording, and more particularly to a video signal recording and/or reproducing apparatus designed to cause a tape to travel in a reverse direction for a predetermined time period and then to turn the power OFF in a state where the tape is loaded along a predetermined tape path when a power source switch is turned OFF during a recording mode.

Generally, in a video signal recording and/or reproducing apparatus, and particularly in a video signal recording and/or reproducing apparatus which records a picked-up video signal from a television camera onto a tape, the apparatus is frequently operated in a manner such that the recording operation is temporarily stopped during the recording and the recording operation is resumed thereafter. It is common to operate the apparatus in this manner when using a portable television camera and recording the picked-up video signal onto the tape by a portable recording and/or reproducing apparatus.

When the power source switch is turned OFF in order to temporarily stop the recording operation while recording the picked-up video signal from the television camera related to a certain picture, rotary heads stop rotating and the tape travel stops. Thus, the tape, which was drawn out of a cassette and loaded along a predetermined tape path within the apparatus upon starting of the recording, is drawn back into the cassette and unloaded. Hence, if the mode of the apparatus is set to the recording mode and the tape is drawn out of the cassette and loaded along the predetermined tape path so as to resume the recording of the picked-up video signal related to another picture, the tape position with respect to the heads before the tape unloading operation does not accurately coincide with the tape position after the tape is loaded again to resume the recording operation. Accordingly, if the recording operation is resumed after carrying out the tape unloading and loading operations as described above, an unrecorded part may be formed on the tape between a previously recorded part and a part which is newly recorded, or an overlapping part may be formed on the tape if the recording is resumed from a part overlapping the previously recorded part.

In order to eliminate the unwanted deviation in the tape position introduced during the tape unloading and loading operations, the tape may be maintained in the loaded state along the predetermined tape path during predetermined modes, that is, measures may be taken to prevent the tape from being unloaded during the predetermined modes.

However, even if measures are taken to maintain the tape in the loaded state, the tape travel does not stop immediately as an operation is carried out to temporarily stop the tape travel, due to inertia of a tape feeding system. As a result, the tape stops after traveling over a certain distance. Further, when resuming the tape travel so as to resume the recording, it will take a certain time period for the tape traveling speed to reach a predetermined tape travel speed. Accordingly, if the recording is resumed by simply resuming the tape travel from a position where the tape stopped, stable recording cannot be carried out during the initial period of the resumed recording. Thus, if a tape recorded in this manner is reproduced, the servo operation becomes unstable at a recording interstice, that is, at the part between where the recording is temporarily stopped and where it is resumed thereafter, and there will be a problem in that the reproduced picture will become distorted. In addition, if the recording is resumed after the tape travel is resumed and the tape travel speed has reached the predetermined tape travel speed, an unrecorded part will be formed on the tape between the previously recorded part and the part which is next recorded, and the reproduced picture will become unsatisfactory for viewing.

In order to prevent such problems from being introduced, it is necessary to automatically rotate a supply reel in a tape take-up direction and rewind the tape by a predetermined quantity before stopping the tape, when temporarily stopping the recording operation. By taking such a measure, the tape travel speed will reach the predetermined tape travel speed over a distance corresponding to the rewound quantity of tape, upon resumption of the recording. Moreover, the recording can be carried out satisfactorily in continuity with the previously recorded part, when the recording is resumed after the tape travel speed has reached the predetermined tape travel speed.

However, when the recording operation is temporarily stopped during the recording, the rotary heads continue to rotate although the tape travel is stopped in the state where the tape is loaded. This is because if the rotary heads also stop rotating, it will take a certain time period (three seconds, for example) for the rotary heads to reach a predetermined rotational speed from the time when the rotary heads begin to rotate, and the beginning of the signal to be recorded will not be recorded.

Accordingly, if the operator forgets to set the mode of the apparatus to a stop mode after temporarily stopping the recording even though the operator no longer intends to resume the recording, or if the apparatus is set to a recording pause mode but the recording of the picked-up signal related to the next picture which is picked up will not be resumed for a long period of time, the apparatus will remain in a recording pause mode during a long period of time. That is, the tape will remain in the temporarily stopped state and the rotary heads will continue to trace over the same portion of the tape during that long period of time. Hence, there will be problems in that the tape will become worn due to friction, magnetic particles will adhere onto the magnetic heads, and the power consumption will become large. Therefore, the conventional apparatus was designed to automatically release the apparatus from the pause mode, unload the tape into the cassette, and turn the power source OFF, if the apparatus is left in the pause mode for longer than a predetermined time period (five minutes, for example).

However, the apparatus may be released from the pause mode even though the operator intended to resume the recording just because the apparatus was left in the pause mode for over five minutes. In such a case, when the mode of the apparatus is set to the recording mode so as to resume the recording, the tape is again drawn out of the cassette and loaded along the predetermined tape path within the apparatus. In this state, the tape position with respect to the heads before the unloading and the tape position after the loading differ, and the previously described problems accompanied by such deviation in the tape position are introduced as a result.

Further, when automatically rewinding the predetermined quantity of tape when temporarily stopping the recording operation as described before, the mode of the apparatus is set to the reproducing mode while the predetermined quantity of tape is being rewound, in order to display the contents of the video signal recorded immediately before the recording is temporarily stopped on a monitoring screen in a viewfinder of the television camera. In this state, when the mode of the apparatus is set simultaneously to the reproducing mode and the recording pause mode, noise will appear in the reproduced picture for a short period of time and the reproduced picture becomes unsatisfactory because no signal is recorded for the portion of the tape which overran due to inertia.

SUMMARY OF THE INVENTION

Accordingly, it is a general object of the present invention to provide a novel and useful video signal recording and/or reproducing apparatus having a function for temporarily stopping the recording, in which the various problems outlined heretofore have been eliminated.

Another and more specific object of the present invention is to provide a video signal recording and/or reproducing apparatus designed so that when a power source switch is turned OFF during a recording mode, the recording operation is stopped, a predetermined quantity of tape is rewound, and a power source supply circuit is thereafter cut off with the tape in a loaded state without unloading the tape into a cassette. According to the apparatus of the present invention, when the power source switch is turned ON again from the above-described state to turn a recording switch ON, it is possible to satisfactorily resume recording which is continuous with a part on the tape where a previous recording was stopped.

Still another object of the present invention is to provide a video signal recording and/or reproducing apparatus designed so that when a recording pause switch is turned ON in a state where a recording lock switch is turned ON and the recording is being carried out, the recording operation is temporarily stopped and the predetermined quantity of tape is rewound, and the power source supply circuit is cut off with the tape in a loaded state without unloading the tape into the cassette after the apparatus is left in the temporarily stopped state for longer than a predetermined time period.

Another object of the present invention is to provide a video signal recording and/or reproducing apparatus having a function for temporarily stopping recording, designed so that the mode of the apparatus is set to a reproducing mode with respect to a recorded portion of the tape and the mode of the apparatus is set to an electrical system mode with respect to an unrecorded portion of the tape when rewinding the predetermined quantity of tape, in order to enable display of the reproduced signal and the recorded signal as a reproduced picture on a monitoring screen. According to the apparatus of the present invention, the unrecorded portion of the tape corresponding to the overrun quantity of tape upon temporary stoppage of the tape travel can be reproduced on the monitoring screen, and noise will not be introduced.

Other objects and further features of the present invention will be apparent from the following detailed description when read in conjunction with the accompanying drawings.

DETAILED DESCRIPTION

Figure 1:
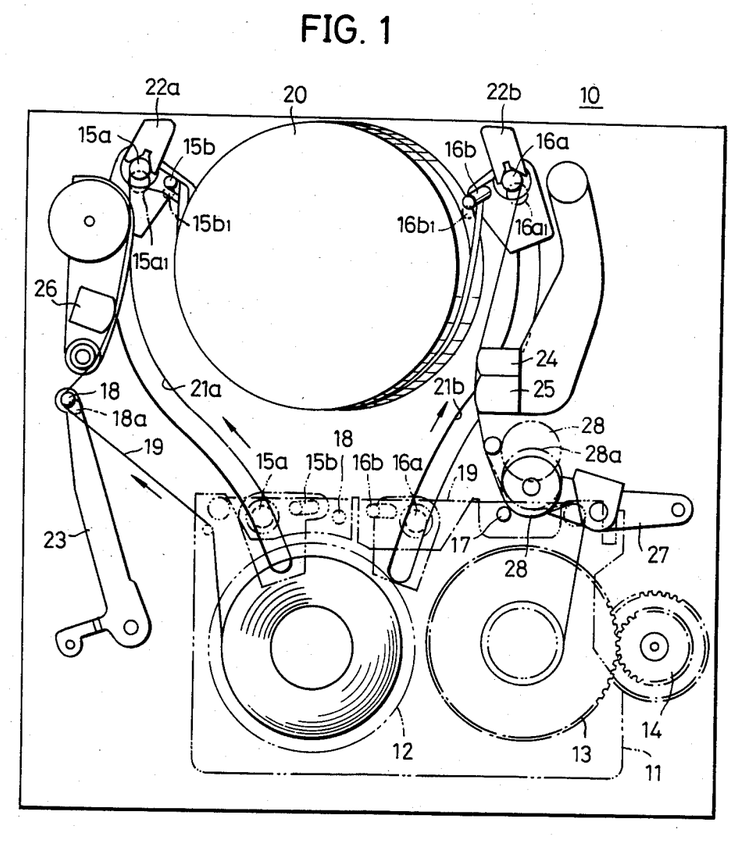
FIG. 1 is a plan view showing an embodiment of a mechanism of a video signal recording and/or reproducing apparatus according to the present invention.

First, when setting the mode of a video signal recording and/or reproducing apparatus 10 according to the present invention to a recording mode, a tape cassette 11 is loaded into a predetermined position within the apparatus 10 as shown in FIG. 1. In the present embodiment of the invention, the tape cassette 11 is a compact type tape cassette, and a reel shaft of the apparatus 10 is inserted into a center hole in a hub of a supply reel 12 of the loaded tape cassette 11. On the other side, a take-up reel 13 of the loaded tape cassette 11 has gear teeth formed on the peripheral edge of a lower flange thereof. The gear teeth formed on the peripheral edge of the lower flange of the take-up reel 13 mesh with the teeth of a driving gear 14, and the take-up reel 13 is rotated as a result of this meshing. In this state, guide poles 15a and 15b, guide poles 16a and 16b, a capstan 17, and a tension pole 18 are all inserted on the inner side of a tape 19, as indicated by a two-dot chain lines in FIG. 1.

Figure 2:
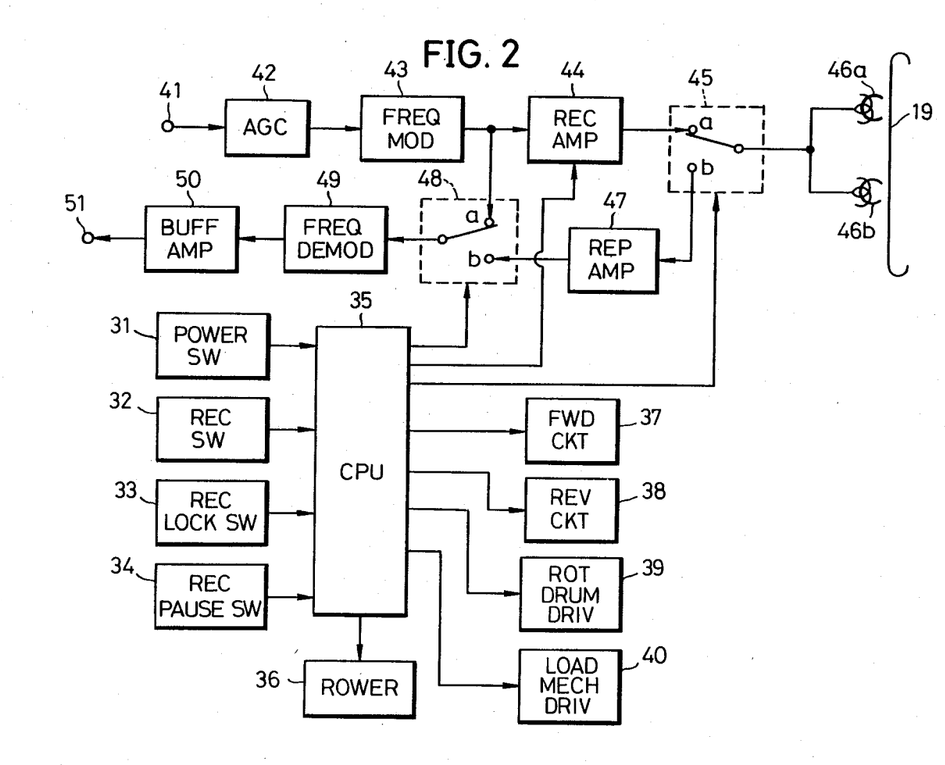
FIG. 2 is a systematic block diagram showing an embodiment of a circuit system of a video signal recording and/or reproducing apparatus according to the present invention.

In the above state, a power source switch 31 and a recording switch 32 shown in FIG. 2 are manipulated and turned ON. By such manipulation of the switches 31 and 32, a power source 36 is turned ON and a rotary drum driving circuit 39 and a loading mechanism driving circuit 40 operate in response to outputs of a central processing unit (CPU) 35. The operation of the CPU 35 will be described hereinafter in conjunction with flowcharts. A rotary guide drum 20 (see FIG. 1) is rotated by the operation of the rotary drum driving circuit 39. As the loading mechanism driving circuit 40 operates, the guide poles 15a and 15b and the guide poles 16a and 16b at the positions indicated by the two-dot chain lines respectively move to positions indicated by a solid lines, along grooves 21a and 21b provided in a chassis. When the guide poles 15a and 15b and the guide poles 16a and 16b are at the positions indicated by the solid lines, upper and lower end parts of the guide poles 15a and 16a respectively make contact with stoppers 22a and 22b, and are positioned by these stoppers 22a nd 22b. The guide poles 15a and 15b and the guide poles 16a and 16b intercept the tape 19 and draw the tape 19 out of the tape cassette 11, as the guide poles 15a and 15b and the guide poles 16a and 16b move along the grooves 21a and 21b. The tension pole 18 also moves to a position indicated by the solid line as a result of the swing of a lever 23 as the guide poles move along the grooves 21a and 21b, and makes contact with the tape 19 on the inner side of the tape 19. In addition, an erasing head 24 and an audio signal and control signal recording and/or reproducing head 25, which were at receded positions, move to positions shown in FIG. 1, and respectively make contact with the tape 19. Accordingly, the tape 19 is disposed along a predetermined tape path such that the tape 19 is fed out from the supply reel 12, makes contact with a full-width erasing head 26, obliquely makes contact with the rotary drum 20 over an angular range slightly larger than 180°, makes contact with the heads 24 and 25, and reaches the take-up reel 13, i.e. tape 19 is "loaded".

The power source switch 31 is a switch which is turned ON and OFF manually. The power source 36 comprises a main power source body, a relay controlled by the CPU 35, and relay contacts which are opened and closed by this relay to turn the power source supply from the main power source body to circuits and devices of the apparatus respectively ON and OFF.

A forward direction tape driving circuit 37 is enabled in response to the output of a signal by the CPU 35, and a lever 27 is accordingly rotated. Thus, a pinch roller 28, which was at a position indicated by the two-dot chain line, moves to a position iindicated by the solid line. Accordingly, the tape 19 which is pinched between the rotating capstan 17 and the pinch roller 28 is driven in the forward direction and taken up by the take-up reel 13, which is rotated by the driving gear 14. The operation of the mechanism in the apparatus shown in FIG. 1, described heretofore, is the same as that of the conventional apparatus, and for example, are disclosed in U.S. patent application Ser. No. 342,926 entitled "RECORDING AND/OR REPRODUCING APPARATUS" filed Jan. 26, 1982.

In FIG. 2, a recording video signal is applied to an input terminal 41. This recording video signal is passed through an automatic gain control (AGC) circuit 42 and supplied to a frequency modulator 43 wherein a carrier is frequency-modulated. The frequency-modulated video signal of the frequency modulator 43 is output to a recording amplifier 44. An output of this recording amplifier 44 is passed through a switch 45, which has its moving contact connected to its contact a, and then applied to rotary heads 46a and 46b which are mounted on the rotary drum 20. As a result, the frequency-modulated video signal is alternately recorded along oblique tracks on the tape by these rotary heads 46a and 46b. At the same time, the output frequency-modulated video signal of the frequency modulator 43 is passed through a switch 48, which has its moving contact connected to its contact a in response to a signal from the CPU 35, and then supplied to a frequency demodulator 49 wherein the signal is demodulated. An output video signal of the frequency demodulator 49 is passed through a buffer amplifier 50 to an output terminal 51. The video signal obtained at the output terminal 51 is supplied to a monitoring receiver provided in a viewfinder of a television camera, for example, and is reproduced to be monitored on the receiver. The signal in the signal system wherein the output of the frequency modulator 43 is supplied to the frequency demodulator 49 through the switch 48 is not the signal recorded and/or reproduced by the rotary heads 46a and 46b, and this signal system is called an electrical system (so-called E—E system). The mode in which the moving contact of the switch 48 is connected to the contact a is called an E—E mode.

Figure 3A:
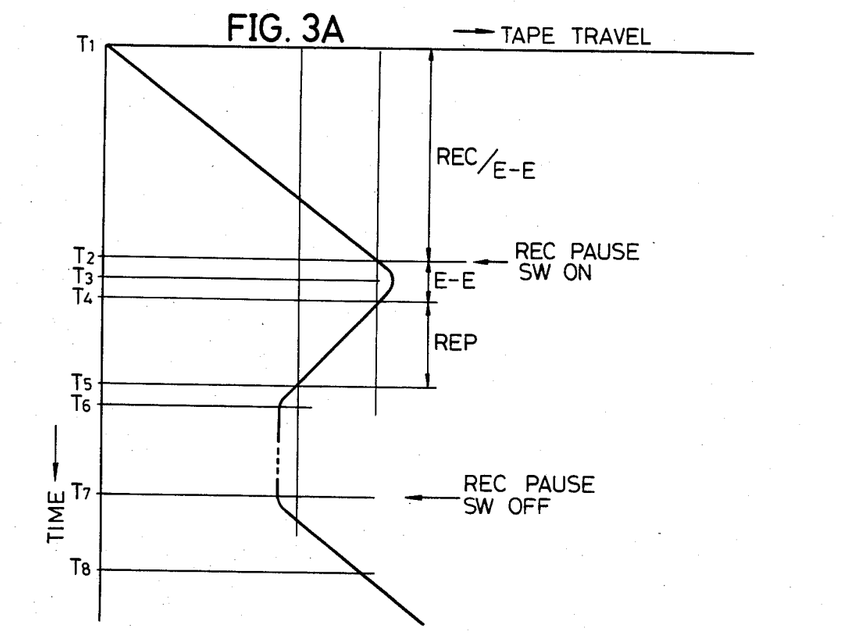
FIGS. 3A, 3B, and 3C are graphs respectively showing the relationship between the direction and magnitude of tape travel with respect to time, for explaining each operation of the apparatus according to the present invention.

For example, it will now be assumed that the recording is carried out by setting the mode of the apparatus to the recording mode at a time T1 as shown in FIG. 3A, and a recording pause switch 34 shown in FIG. 2 is turned ON at a time T2 so as to temporarily stop the recording and set the mode of the apparatus to a recording waiting mode. In this case, the CPU 35 supplies a signal to disable the forward direction tape driving circuit 37, thereby stopping the tape travel. However, the tape travel does not stop immediately at the time T2 and continues to travel due to inertia and the like of the mechanism of the tape feeding system, and finally stops at a time T3 after overrunning. The time interval between the times T2 and T3 is 0.2 second, for example.

Next, the CPU 35 supplies a signal to enable a reverse direction tape driving circuit 38, and the tape 19 travels in the reverse direction to be taken up by the supply reel 12 in a state where the tape 19 is loaded along the predetermined tape path. The tape travel in the reverse direction is carried out so that the tape 19 travels in the reverse direction by an amount corresponding to the amount of tape overrun between the times T2 and T3 by a time T4, and the tape travel in the reverse direction is continued until a time T5 for a predetermined time interval after time T4, for example, 1 second. The tape travel in the reverse direction is stopped at time T5. However, the tape 19 continues to travel in the reverse direction for 0.2 second due to inertia even after the reverse direction tape driving circuit 38 is disabled at time T5, and finally stops at a time T6. The mode of the apparatus is set to the recording pause mode at time T6. While the mode of the apparatus is set to the pause mode, the tape loading mechanism does not carry out the tape unloading operation and remains in its tape loading state. Thus, in this state, the tape 19 remains loaded along the predetermined tape path. In addition, the rotary drum 20 does not stop and remains in a state ready to resume the recording or reproduction during this pause mode of the apparatus, and the rotary heads 46a and 46b continue to rotate during the recording pause mode.

During the above-described operation, the recording amplifier 44 is put into a recording mute state by a signal from the CPU 35 at the time T2 when the recording pause switch 34 is turned on, and the supply of the recording signal to the switch 45 is accordingly cut off. Hence, heads 46a and 46b stop the recording on the tape 19 after the time T2. In this state, the moving contact of the switch 48 remains connected to the contact a, and thus remains in the E—E mode. The moving contact of the switch 48 switches and connects to contact b at time T4 in response to a signal from the CPU 35. Further, the moving contact of the switch 45 switches and connects to a contact b between the times T2 and T4, that is, at the time T3, for example, in response to a signal from the CPU 35. As a result, the heads 46a and 46b carry out reproduction after the time T4 while the tape 19 travels in the reverse direction. The signal reproduced from the heads 46a and 46b passes through the switch 45, a reproducing amplifier 47, and the switch 48, and is supplied to the frequency demodulator 49. The output of the frequency demodulator 49 is supplied to the buffer amplifier 50, and the reproduced signal is delivered to the output terminal 51. Thereafter, the moving contacts of the switches 45 and 48 switch and connect to the respective contacts a at the time T5, in response to signals respectively supplied thereto from the CPU 35.

Therefore, during a recording interval T1-T2, the video signal being recorded is monitored on the monitoring screen of the viewfinder of the television camera which is supplied with the signal from the output terminal 51, where the interval T1-T2 indicates the interval from the time T1 to the time T2. The recording is not carried out during an interval T2-T4, however, the picture corresponding to the recorded video signal is monitored on the monitoring screen. During an interval T4-T5, the recorded video signal is checked by reproducing the contents recorded immediately prior to the time T2 when the recording was temporarily stopped. If the mode of the apparatus were to be set immediately to the reproducing mode at the time T2, reproduction would be carried out with respect to the unrecorded portion during the interval T2-T4, and no picture and only noise would be displayed on the monitoring screen during this interval making it unpleasant to the viewer. On the other hand, according to the present invention, the mode of the apparatus is set to the E—E mode during this interval T2-T4 in which the heads 46a and 46b trace over the unrecorded portion on the tape 19. Thus, according to the present invention, the picture containing only noise will not be displayed during the interval T2-T4, which prevents unpleasantness to the viewer.

Next, the recording pause switch 34 is turned OFF at an arbitrary time T7 so as to resume the recording, where an interval T6-T7 is less than five minutes, for example. When the recording pause switch 34 is turned OFF, the CPU 35 supplies a signal in response to which the forward direction tape driving circuit 37 is enabled so as to resume the tape travel in the forward direction. In this state, the moving contacts of the switches 45 and 48 switch and connect to the respective contacts a in response to signals from the CPU 35, and the recording amplifier 44 is put into the recording mute state in response to a signal from the CPU 35. Accordingly, the mode of the apparauts is set to the E—E mode from the time T7, and the heads 46a and 46b do not record.

At a time T8 which is 1.1 seconds after time T7 when the tape travel was resumed, the CPU 35 operates to release the recording amplifier 44 from its recording mute state. Thus, the recording signal from the frequency modulator 43 is supplied to the heads 46a and 46b through the recording amplifier 44, and recorded onto the tape 19. During the above interval T7-T8, the tape travel caused by the tape feeding mechanism fully accelerates and reaches a predetermined tape travel speed. The head 25 is in the reproducing mode and reproduces the control signal recorded on the tape 19 during the interval T7-T8, and the servo operation with respect to the tape feeding system is carried out by use of this reproduced control signal. By the time T8, the tape travels in a state in phase with the control signal in the recorded signal portion. Hence, the recording video signal of the next picture which is picked up can be recorded satisfactorily from the time T8. The position of the tape 19 with respect to the heads at the time T8, precedes the position of the tape 19 at the time T2 by a distance corresponding to approximately 0.1 second in time. As a result, a new signal is recorded on top of the previously recorded signal for an exceedingly short period of time. However, the recorded signal is erased during this exceedingly short period of time due to the erasing effect, and no problems will be introduced from the practical point of view.

If the apparatus is not manipulated in any way for a predetermined time interval of over five minutes, for example, after the time T6, the tape 19 is unloaded into the tape cassette 11 by the loading mechanism driving circuit 40 similarly as in the conventional apparatus. Moreover, the power source 36 is turned OFF and the rotary heads stop rotating, to prevent unnecessary power consumption and unwanted wear of the tape and heads due to friction.

Next, the operation of the apparatus will be described in a case where the recording pause switch 34 is turned ON in a state where the recording lock switch 33 is turned ON simultaneously as when the recording switch 32 is turned ON or after the recording switch 32 is turned ON.

Figure 3B:
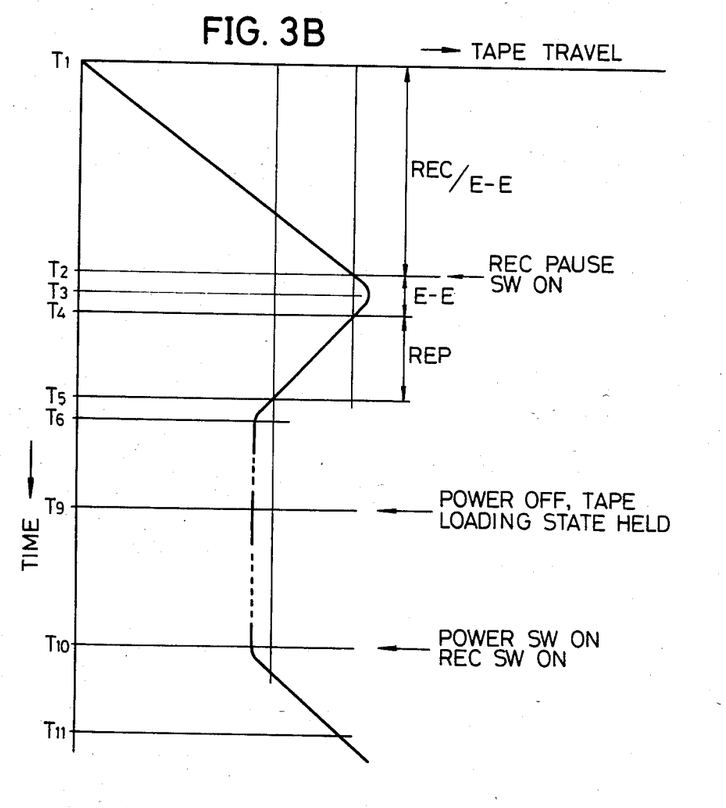

In this case, the recording pause switch 34 is turned ON at an arbitrary time T2 after the start of recording at a time T1 as shown in FIG. 3B, and the operation of the apparatus up to a time T6 after the time T2 is the same as that described in conjunction with FIG. 3A. Because the recording lock switch 33 is turned ON before the recording pause switch 34 is turned ON in this case, if the apparatus is not manipulated in any way for a predetermined time interval of over five minutes, for example, after the time T6, the recording switch 32 is turned OFF, the power source switch 31 is turned OFF, and the power source 36 is turned OFF at a time T9 after that predetermined time interval has elapsed. However, the loading mechanism driving circuit 40 does not carry out the tape unloading operation at the time T9, and slightly displaces the loading mechanism in the unloading direction so as to slacken the tape 19. That is, at the time T9, the guide poles 15a and 15b and the guide poles 16a and 16b shown in FIG. 1 are respectively displaced to positions 15a1, 15b1, 16a1, and 16b1, indicated by one-dot chain lines, from the positions indicated by the solid line, and moreover, the pinch roller 28 is also displaced to a position 28a indicated by the one-dot chain line, from the position indicated by the solid line. By the above displacement of the guide poles 15a and 15b and the guide poles 16a and 16b, slack is introduced in the tape 19 which is loaded along the predetermined tape path, and the tape 19 is prevented from sticking to the rotary drum 20. In addition, because the tension in the tape 19 is reduced, the tension pole 18 is lso displaced to a position 18a indicated by the one-dot chain line. Furthermore, since the pinch roller 28 is displaced to the position 28a, the pinch roller 28 is prevented from deforming due to continuous contact with the capstan 17.

Thereafter, in order to continue recording of the video signal for the next picture picked up, the power source switch 31 and the recording switch 32 are again turned ON at an arbitrary time T10. Thus, the guide poles 15a and 15b and the guide poles 16a and 16b shown in FIG. 1 are respectively displaced to the positions indicated by the solid line from the positions indicated by the one-dot chain lines, and the pinch roller 28 is also displaced to the position indicated by the solid line from the position indicated by the one-dot chain line. Accordingly, after the time T10, the operation of the apparatus is the same as that carried out after the time T7 in the case described in conjunction with FIG. 3A. The times T10 and T11 in FIG. 3B correspond to the times T7 and T8 in FIG. 3A.

In this case, when the recording is resumed at the time T10, the tape 19 is not unloaded into the tape cassette 11 and is positioned substantially along the predetermined tape path. For this reason, the position of the tape 19 with respect to the heads 46a and 46b substantially does not change even if the guide poles 15a and 15b and the guide poles 16a and 16b are slightly displaced to the positions indicated by the solid lines from the positions indicated by the one-dot chain line. If the tape is unloaded after the above predetermined time interval has elapsed and then loaded when the recording is resumed, the position of the tape with respect to the heads upon resumption of the recording will deviate greatly from the position of the tape when the recording is temporarily stopped. However, according to the present invention, the position of the tape with respect to the heads will not deviate, and the recording can be carried out satisfactorily in continuity with the previously recorded portion.

The predetermined time interval, which is five minutes in the example above, need not be the time interval from the time T6, and may be the time interval from the time T2 when the recording pause switch 34 is turned ON.

Next, the operation of the apparatus will be described in a case where the power source switch 31 is turned OFF in a state where the recording lock switch 33 is turned ON simultaneously as when the recording switch 32 is turned ON or after the recording switch is turned ON.

Figure 3C:
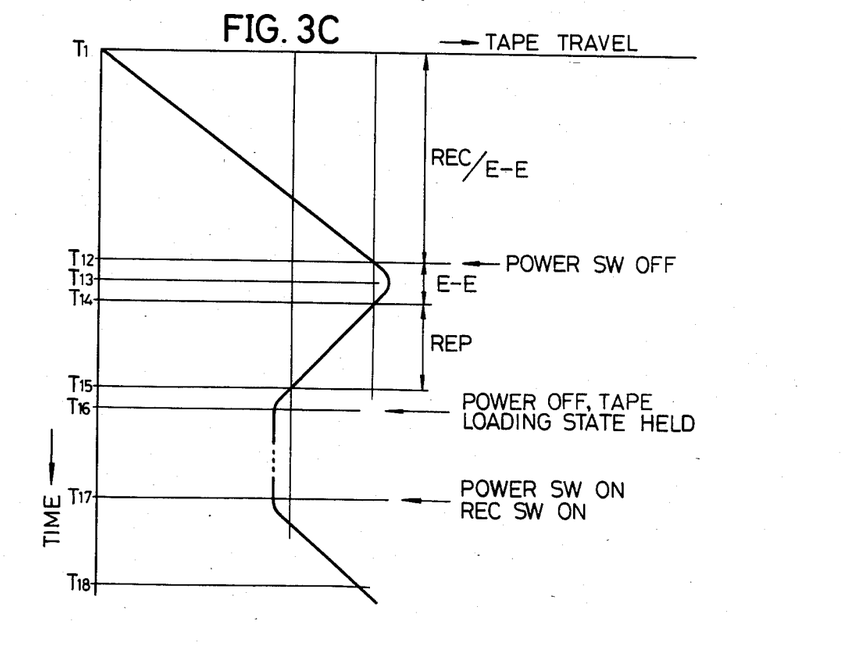

In this case, when the recording is started at a time T1 and the power source switch 31 is turned OFF thereafter at an arbitrary time T12 as shown in FIG. 3C, the operation of the apparatus from the time T12 to a time T16 is completely the same as that carried out from the time T2 to the time T6 as previously described in conjunction with FIG. 3A. The times T12 to T16 correspond to the times T2 to T6, respectively.

That is, when the power source switch 31 is turned OFF at the time T12, the tape 19 stops after overrunning by a certain amount and then travels in the reverse direction, and finally stops at the time T16 after traveling in the reverse direction by a predetermined amount. The power source 36 is also turned OFF at the time T16. In addition, as described before with respect to the time T9 in conjunction with FIG. 3B, the tape 19 is not unloaded. That is, the tape 19 remains in the substantially loaded state and is slightly slackened, so as to prevent the tape 19 from sticking the rotary drum 20, prevent deformation of the pinch roller 28, and the like. Accordingly, the operation of the apparatus at the time T16 is the same as that at the time T9 shown in FIG. 3B, carried out at the time T6 in FIG. 3A.

Figure 4A:
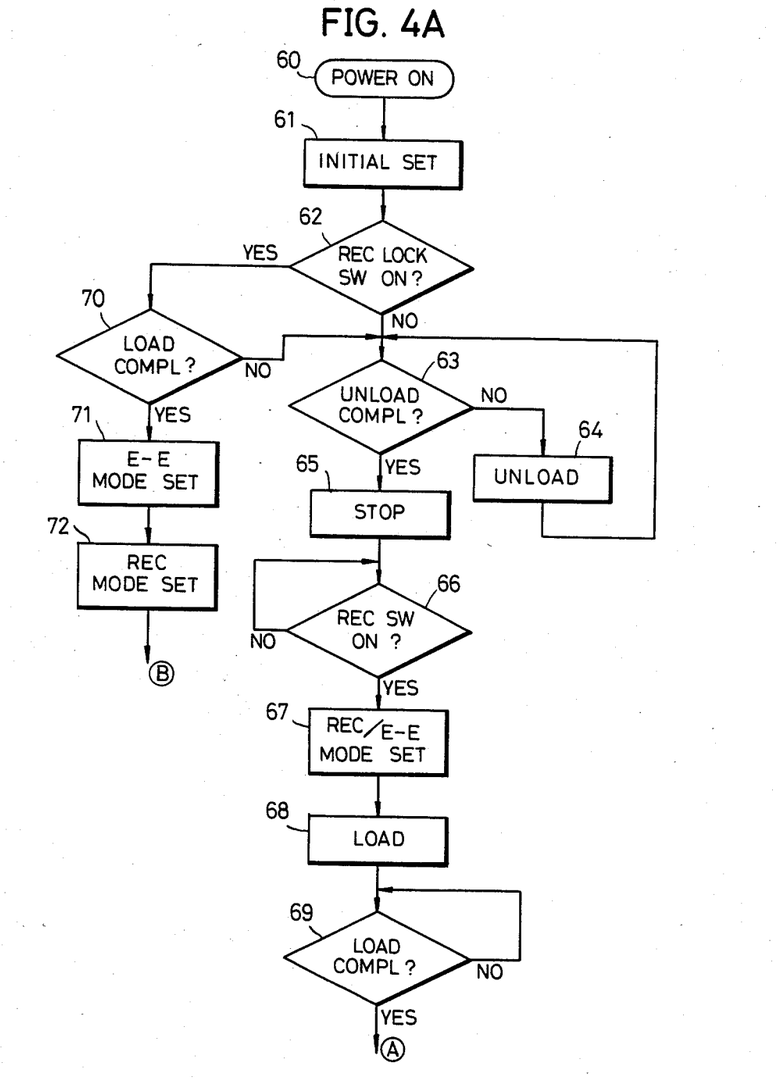
FIGS. 4A and 4B respectively are flowcharts for explaining the opertion of a microcomputer in the block system shown in FIG. 1.
Figure 4B:
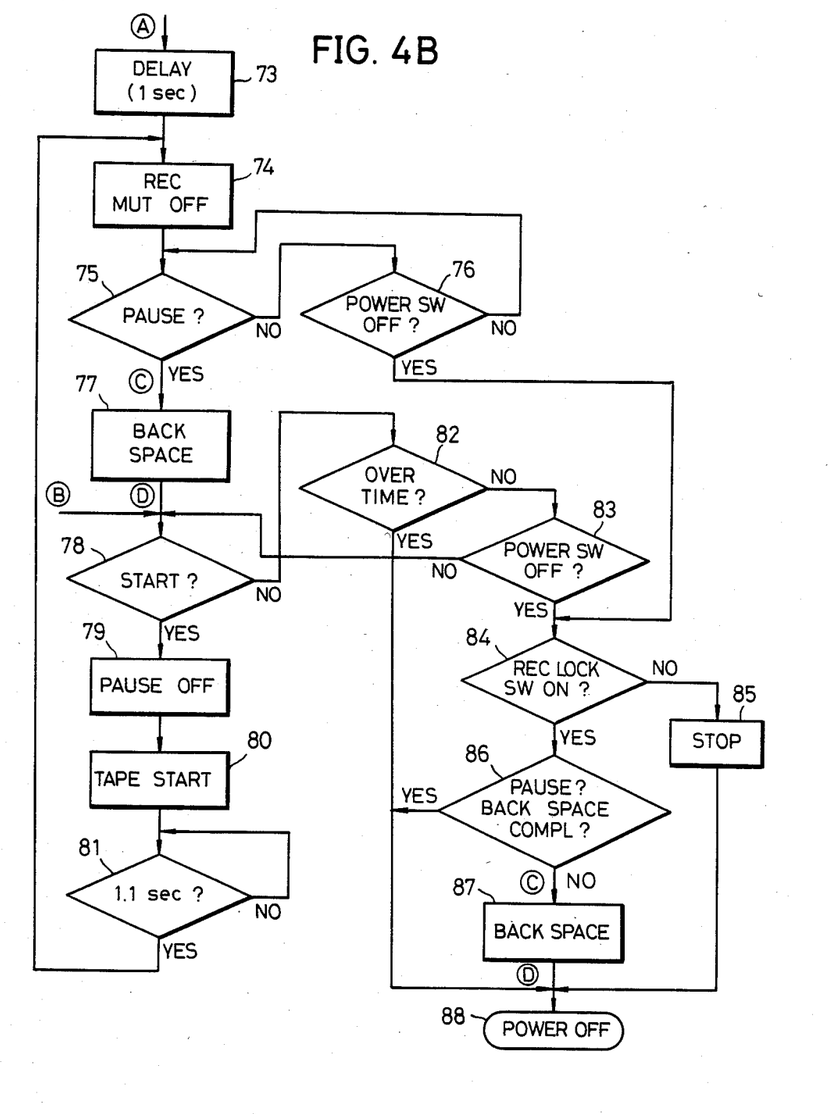

Next, the operation of the CPU 35 which controls the apparatus described heretofore will be described in conjunction with the flowcharts shown in FIGS. 4A, 4B, and 5. In FIG. 4A, the power source 36 is turned ON according to the ON state of the power source switch 31, at a step 60. A search is carried out at a step 61 to detect the states of the various switches, so as to carry out the initial setting. A step 62 discriminates whether the recording lock switch 33 is in the ON state. The result of the discrimination at the step 62 is "NO" when the recording lock switch 33 is OFF, and a step 63 is subsequently carried out to discriminate whether the tape is unloaded into the tape cassette, that is, whether the tape unloading operation has been completed. If the result of the discrimination at the step 63 is "NO", that is, if the tape is in the loaded state, where the tape is drawn out of the tape cassette and loaded along the predetermined tape path, the tape is unloaded at a step 64 and returned inside the tape cassette. On the other hand, when the unloading is completed, the discrimination result at the step 63 is "YES", and a step 65 is subsequently carried out to set the apparatus to the stop mode. After carrying out the step 65, a step 66 is carried out to discriminate whether the recording switch 32 is turned ON. The discrimination result at the step 66 is "NO" if the recording switch 32 remains turned OFF, and in this case, the discrimination is continuously carried out until the discrimination result becomes "YES".

When the recording switch 32 is turned ON, the discrimination result at the step 66 becomes "YES", and a step 67 is subsequently carried out to set the mode of the apparatus to the recording and E—E mode. A step 68 is carried out subsequent to the step 67, to operate the loading mechanism driving circuit 40 and load the tape. After completing the step 68, a step 69 is carried out to discriminate whether the loading of the tape has been completed. If the discrimination result at the step 69 is "NO", the discrimination is continuously carried out until the discrimination result becomes "YES", that is, until the loading of the tape is completed. When the discrimination result at the step 69 becomes "YES", the operation continues to A shown in FIG. 4B from A shown in FIG. 4A, that is, a step 73 is subsequently carried out to perform a delay of one second. A step 74 is carried out subsequent to the step 73 to turn OFF the muting with respect to the recording amplifier 44. By performing a delay of one second at the step 73 and then turning the muting OFF at the step 74, the recording is started satisfactorily after the tape travel speed has reached the predetermined tape travel speed, because the tape travel speed reaches the predetermined tape travel speed within one second from the time when the tape travel is started.

After the recording is started, a step 75 discriminates whether the recording pause switch 34 has been turned ON. If the recording pause switch 34 remains turned OFF, the discrimination result at the step 75 is "NO", and a step 76 is subsequently carried out to discriminate whether the power source switch 31 has been turned OFF. The discrimination result at the step 76 is "NO" if the power source switch 31 remains turned ON, and the operation returns to the step 75. When the power source switch 31 is turned OFF, the discrimination result at the step 76 is "YES", and a step 84 which will be described hereinafter is subsequently carried out.

Figure 5:
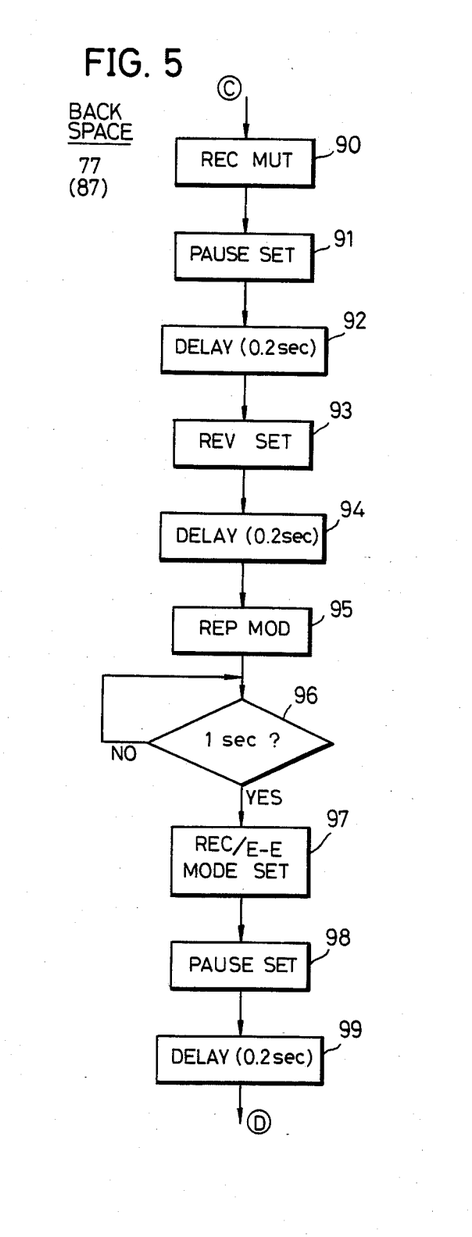
FIG. 5 is a flowchart showing a back spacing step in the flowcharts shown in FIG. 4 in more detail.

On the other hand, when the recording pause switch 34 is turned ON, the discrimination result at the step 75 is "YES", and a step 77, which will be described hereinafter in conjunction with FIG. 5, is subsequently carried out to perform back-spacing, that is, cause tape travel in the reverse direction. A subsequent step 78 discriminates whether the start operation has been performed. This start operation corresponds to the operation in which the recording switch 32 is again turned ON, as described previously, and corresponds to the manipulation to turn ON the start switch when performing remote control from the television camera. When the discrimination result at the step 78 is "YES", a subsequent step 79 turns OFF the pause mode. Thereafter, the tape travel is started at a step 80, and a step 81 discriminates whether a time span of 1.1 seconds has elapsed from the time when the tape travel was started. The step 81 continues to carry out the discrimination until 1.1 seconds elapses. The discrimination result at the step 81 becomes "YES" when 1.1 seconds elapses from the time when the tape travel was started, and the operation returns to the step 74 to carry out the operations previously described.

When the discrimination result at the step 78 is "NO", a step 82 is subsequently carried out to discriminate whether a predetermined time interval (five minutes) has elapsed. The discrimination result at the step 82 is "YES" if the predetermined time interval has elapsed, and a step 88 is subsequently carried out to turn OFF the power source. If the discrimination result at the step 82 is "NO", a step 83 discriminates whether the power source switch 31 has been turned OFF. The operation is returned to the step 78 if the power source switch 31 has not been turned OFF, that is, if the discrimination result at the step 83 is "NO". On the other hand, if the discrimination result at the step 83 is "YES", the step 84 is subsequently carried out as in the case where the discrimination result at the step 76 is "YES", in order to discriminate whether the recording lock switch 33 has been turned ON. If the discrimination result at the step 84 is "NO", the mode of the apparatus is set to the stop mode at a step 85, and the power source is turned OFF at the subsequent step 88. On the other hand, if the discrimination result at the step 84 is "YES", a step 86 discriminates whether the mode of the apparatus has been set to the pause mode, that is, whether the back-spacing has been completed. The power source is turned OFF at the step 88 if the discrimination result at the step 86 is "YES". However, if the discrimination result at the step 86 is "NO", the back-spacing is carried out at a step 87 before the power source is turned OFF at the step 88.

On the other hand, if the discrimination result at the step 62 shown in FIG. 4A is "YES", that is, if the recording lock switch 33 is ON, a step 70 discriminates whether the loading of the tape has been completed. If the discrimination result at the step 70 is "NO", the step 63 is subsequently carried out. However, if the discrimination result at the step 70 is "YES", a step 71 is subsequently carried out to set the mode of the apparatus to the E—E mode. The recording mode is set at a step 72 subsequent to the step 71, and the operation continues to B shown in FIG. 4B from B shown in FIG. 4A, that is, the step 78 is subsequently carried out.

Details of the back-spacing carried out at the step 77 will now be described in conjunction with FIG. 5. It should be noted that the steps 77 and 87 shown in FIG. 4B are identical steps. When the discrimination result at the step 86 shown in FIG. 4B is "NO", the operation continues to C shown in FIG. 4B from C shown in FIG. 5, that is, a step 90 is carried out to perform the recording mute operation by the recording amplifier 44. The pause mode is set at a step 91 subsequent to the step 90, and a step 92 is carried out to perform a delay of 0.2 second. Moreover, a reverse setting is performed at a step 93 to set the tape travel in the reverse direction. A step 94 is carried out to perform another delay of 0.2 second, and the mode of the apparatus is set to the reproducing mode at a step 95. A step 96 subsequent to the step 95 discriminates whether one second has elapsed. The discrimination at the step 96 is continued until one second elapses, and the mode of the apparatus is set to the recording and E—E mode at a step 97 when the discrimination result at the step 96 becomes "YES". The pause mode is set at a step 98, and a delay of 0.2 second is performed at a step 99. After carrying out the step 99, the operation continues to D shown in FIG. 4B from D shown in FIG. 5.

Instead of performing the 0.2-second delay at the step 94, output pulses of a frequency generator provided on the flywheel of the capstan 17 may be counted, although the frequency generator and the flywheel are not shown in FIG. 1. In this case, it is possible to detect the time T4 by detecting the time when the counted value returns to zero, by counting up the output pulses of the frequency generator in the forward direction from the time T2 (T12) to the time T3 (T13) and counting down the output pulses after the time T3 (T13) since the direction of the tape travel reverses after the time T3 (T13). By detecting the magnitude of tape travel according to the rotation quantity of the capstan instead of detecting the times, it is possible to more accurately detect the position where the recording is temporarily stopped.

Further, the present invention is not limited to these embodiments, but various variations and modifications may be made without departing from the scope of the present invention.

What is claimed is:

1. A video signal recording and/or reproducing apparatus comprising:
   tape loading and unloading means for loading a magnetic tape along a predetermined tape path by drawing the tape outside a tape cassette which is loaded into said recording and/or reproducing apparatus when the recording and/or reproducing apparatus is set to a recording mode or a reproducing mode, and for unloading the tape from the predetermined tape path by returning the tape inside the tape cassette when the recording and/or reproducing apparatus is set to a stop mode;
   a power source switch having ON and OFF states;
   a power source turned ON or OFF in response to the ON or OFF state of said power source switch;
   magnetic head means for recording a video signal on the tape disposed along the predetermined tape path during the recording mode and for reproducing the recorded video signal from the tape disposed along the predetermined tape path during the reproducing mode;
   driving means coupled to said power source for driving the tape to move;
   control means for controlling said driving means to move the tape in a forward direction during the recording mode and in a reverse direction for a predetermined time period and then stop the tape when said power source switch is turned OFF during the recording mode, said reverse direction being opposite to said forward direction; and
   turning OFF means for turning OFF said power source in a state where the tape is substantially disposed along the predetermined tape path when the tape stops after moving in the reverse direction for said predetermined time period.

2. A video signal recording and/or reproducing apparatus as claimed in claim 1 which further comprises means for starting a recording by said head means after said tape moves in said forward direction for a time period closely approximating said predetermined time period in which said tape moves in said reverse direction when the power source switch is turned ON again to set the mode of the recording and/or reproducing apparatus to the recording mode after the power source switch is turned OFF by said turning OFF means.

3. A video signal recording and/or reproducing apparatus as claimed in claim 1 which further comprises mode control means for controlling said head means to record said video signal during said recording mode and for setting the mode of the recording and/or reproducing apparatus to an electrical system (E—E) mode in which said video signal is supplied to a monitoring screen without passing through said head means, said mode control means controlling said recording and/or reproducing apparatus to maintain the electrical system mode for a specific time period after said power source switch is turned OFF and thereafter setting the mode of the recording and/or reproducing apparatus to the reproducing mode while said tape is moving in said reverse direction.

4. A video signal recording and/or reproducing apparatus as claimed in claim 3 in which said specific time period is a time period in which said tape overruns due to inertia after said power source switch is turned OFF and then moves in said reverse direction by a quantity corresponding to an overrun quantity of tape.

5. A video signal recording and/or reproducing apparatus as claimed in claim 1 which further comprises a recording pause switch for temporarily stopping the recording during the recording mode, said control means controlling said driving means to stop the tape after moving the tape in said reverse direction for said predetermined time period when said recording pause switch is turned ON during the recording mode in which said tape moves in said forward direction, and mode control means for controlling said head means to record said video signal during said recording mode and for setting the mode of the recording and/or reproducing apparatus to an electrical system (E—E) mode in which said video signal is supplied to a monitoring screen without passing through said head means, said mode control means controlling said recording and/or reproducing apparatus to maintain the electrical system mode for a specific time period after said power source switch is turned OFF or said recording pause switch is turned ON and thereafter setting the mode of the recording and/or reproducing apparatus to the reproducing mode while said tape is moving in said reverse direction.

6. A video signal recording and/or reproducing apparatus as claimed in claim 5 which further comprises a recording lock switch, said turning OFF means turning OFF said power source in the state where the tape is substantially disposed along the predetermined tape path when the recording and/or reproducing apparatus remains in the same mode for another predetermined time period after said tape moves in said reverse direction then stops and said recording pause switch is turned ON in a state where said recording lock switch is ON.

7. A video signal recording and/or reproducing apparatus as claimed in claim 1 in which said tape loading and unloading means slightly slackens the tape which is disposed along said predetermined tape path when said tape stops after moving in said reverse direction for said predetermined time period.

8. A video signal recording and/or reproducing apparatus as claimed in claim 1 in which said predetermined time period is approximately equal to one second.

9. A video signal recording and/or reproducing apparatus as claimed in claim 3 in which said specific time period is approximately equal to 0.4 second.

10. A video recording and/or reproducing apparatus as claimed in claim 6 in which said other predetermined time period is approximately equal to five minutes.

* * * * *